Figure 1:
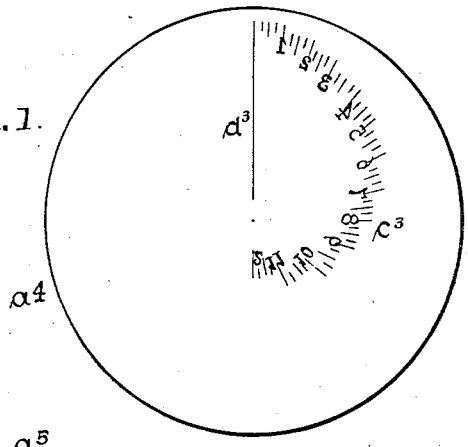

A. PESTEL.
SCALES INDICATING THE ADVANCE OF THEIR MULTIPLE RECORDS.
APPLICATION FILED APR. 19, 1911.

1,124,510.

Patented Jan. 12, 1915.

WITNESSES
Herbert S. Swan
N. Udell Pease

INVENTOR
Arthur Pestel

UNITED STATES PATENT OFFICE.

ARTHUR PESTEL, OF NEW YORK, N. Y.

SCALES INDICATING THE ADVANCE OF THEIR MULTIPLE RECORDS.

1,124,510.  Specification of Letters Patent.  Patented Jan. 12, 1915.

Application filed April 19, 1911. Serial No. 622,091.

*To all whom it may concern:*

Be it known that I, ARTHUR PESTEL, a citizen of the United States, and resident of the borough of Manhattan, city, county, and State of New York, have invented new and useful Scales Indicating the Advance of Their Multiple Records.

The object of this invention is to provide a die or marker for use in a recording device of such a character that by inspection of two successive records made from said die upon a record blank, the amount of movement of said die in the interval between the taking of the two records may be directly determined.

I have illustrated my invention in the following drawings in which similar reference characters refer to similar parts.

Figure 3:
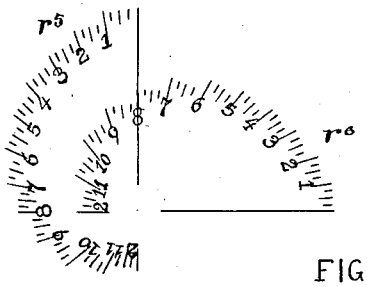
Figure 2:
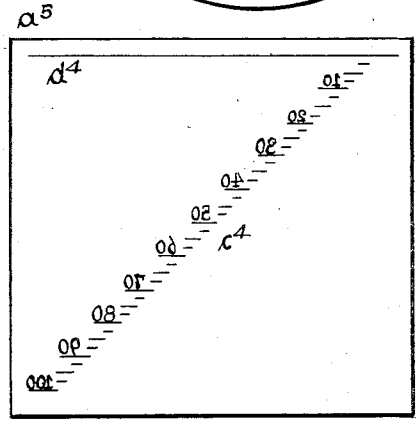
Figure 4:
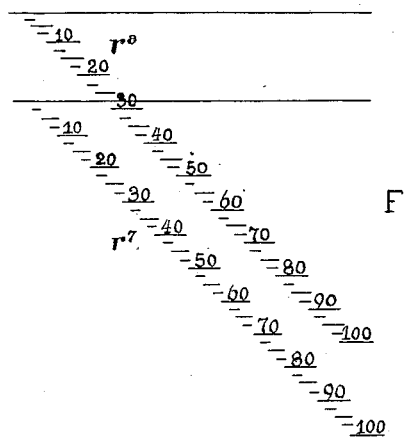

Figure 1 is a plan view of a die embodying my invention. Fig. 2 shows a modification of the die disclosed in Fig. 1. Fig. 3 is a view showing two successive records taken from the die shown in Fig. 1. Fig. 4 is a view showing two successive records taken from the die shown in Fig. 2.

Referring to Fig. 1, $a^4$ is a block of any material suitable for having formed thereon a recording scale $c^3$; scale $c^3$ has its zero index $d^3$ extended at right angles to the direction of movement of the scale to form a distinctive mark. The spiral-like scale $c^3$ has indices arranged eccentrically to the axis of rotation of the block $a^4$.

The mode of operating this scale is as follows: A record $r^6$, Fig. 3, is taken from the scale $c^3$ in the position it assumes at the beginning of the movement desired to be measured and at the end of the movement another record $r^5$ is taken. The point at which the zero index $d^3$ of the scale $c^3$ as made by the second recording operation crosses the record $r^6$ of the scale $c^3$ as made by the first recording operation will indicate the amount of movement between these two recording operations. This enables the taking of two or more records without superimposing one on the other.

It is self-evident that the die could remain stationary while the record blank would be moving and that therefore the amount of movement of the record blank instead that of the die could be determined.

Fig. 2, showing a linearly moveable die $a^5$ with a scale $c^4$ and zero index $d^4$ is a modification, which enables two or more successive records to be taken from said linearly movable die, without superimposing the records as shown in Fig. 4 records $r^7$, $r^8$. As shown in Fig. 4 this arrangement presents a set of records $r^7$, $r^8$ identical with the records shown in Fig. 3.

Having fully described my invention, what I claim is the following:

1. A device adapted to occupy consecutive positions in a predetermined direction of travel, said device being provided with a series of indices arranged obliquely to said direction of travel and having a zero index that extends transversely to said direction.

2. A recording body adapted to occupy consecutive positions in a predetermined direction of travel, said body being provided with a scale arranged obliquely to said direction of travel and being adapted to produce consecutive laterally spaced imprints.

3. A recording body, having a movement in a predetermined direction having a series of indices arranged at an angle to said direction and having the zero index extended at right angles to the direction of movement of said body.

Signed at New York, in the county of New York and State of New York this 17th day of April A. D. 1911.

ARTHUR PESTEL.

Witnesses:
SYDNEY D. M. HUDSON,
HENRY P. RIES.